April 20, 1943.   L. N. POND   2,316,972
COATING APPARATUS
Filed March 7, 1941   10 Sheets-Sheet 6

INVENTOR.
LEANDER N. POND
BY F. H. Knight
ATTORNEY.

April 20, 1943. L. N. POND 2,316,972
COATING APPARATUS
Filed March 7, 1941 10 Sheets-Sheet 7

INVENTOR.
LEANDER N. POND
BY
ATTORNEY.

April 20, 1943.   L. N. POND   2,316,972
COATING APPARATUS
Filed March 7, 1941   10 Sheets-Sheet 8

INVENTOR.
LEANDER N. POND
BY
ATTORNEY.

Patented Apr. 20, 1943

2,316,972

UNITED STATES PATENT OFFICE 2,316,972

COATING APPARATUS

Leander N. Pond, Corning, N. Y., assignor to Corning Glass Works, Corning, N. Y., a corporation of New York Application March 7, 1941, Serial No. 382,245

18 Claims. (Cl. 117—4)

The present invention relates to the coating of articles and more particularly to a method of and/or apparatus suitable for coating the interior and exterior surfaces of transparent hollow articles ordinarily employed as Christmas tree ornaments, vases, and for other decorative purposes.

In the past, thin walled hollow glass articles of this nature, silvered on their inner surfaces only or, in addition, having a thin semi-transparent color coating on their exterior surfaces, have been imported for the reason that there were no known methods or apparatus by which they could be produced in this country in competition with those made by hand labor abroad.

One object of the present invention is an economical method of decorating articles.

Another object is a continuous process of article decoration.

Another object is an economical method of coating the interior surfaces of hollow articles with a decorative material.

A still further object is an efficient method of silver coating the inner surfaces of hollow glass articles.

Another object is an apparatus capable of coating the interior and exterior surfaces of hollow articles.

A still further object is an apparatus capable of supporting an article by a waste portion thereof, treating a surface of the article and of severing the treated article from the waste portion.

Other objects and features of the invention will become apparent from a perusal of the following description of the accompanying drawings which disclose applicant's invention as applied to the decoration of articles of the above defined character.

*Brief description of operation*

The structure as herein illustrated in brief operates as follows: A row of mouthed articles is placed on a suitable feeding platform at the end of the machine illustrated in Fig. 1. Rows of chucks moved in step-by-step fashion by conveyor chains seize the articles and advance them to a washing station where they arrive mouth down. At this station washing nozzles are raised into the mouths of the articles through bores in the article holding chuck jaws. A washing solution is then injected into the articles and the nozzles again lowered clear of the chucks just before they are advanced another step. The articles, after being advanced several steps, are subjected to a rinsing liquid. Following the rinsing operation they are advanced to a silver solution receiving station. As they approach this station an article turnover track section is encountered by means of which the articles are revolved one-half revolution so that their mouths are faced up upon arrival at the silver solution receiving station. At this station nozzles are lowered into the articles and, by means of measuring pumps, measured quantities of two different solutions are simultaneously introduced into the articles, after which the nozzles are raised and the step-by-step advance of the articles continued. A few steps beyond the silver solution receiving station, the support for the articles is advanced off a stationary track onto a movable track section to which there is imparted a continuous compound rocking motion so that as the articles are advanced over this track section the silvering solutions are washed back and forth over the inner surfaces of the articles long enough to suitably silver them.

Soon after the support for the articles is advanced off the movable track section a second turnover track section is encountered and by means of which the articles are inverted and the surplus silvering solutions allowed to drain therefrom. After advancing a few steps further the articles are again rinsed in the same fashion as before silvering and are then advanced through a number of positions at each of which a drying fluid is injected into the articles. After this, the articles are advanced about the end of the machine and start their return toward its loading end. At the conclusion of the second step of return movement, the articles are in suspended position, with respect to their holding chucks, over baths of coating material. These baths are raised to practically submerge the articles therein and then lowered before the commencement of the subsequent step of the return movement. During this subsequent step the article support encounters a third turnover track section which inverts the articles, thereby permitting immediate drainage of the surplus coloring material toward the moil portion of the article. Through a major portion of their subsequent travel toward the loading end of the machine, the articles are within a drying tunnel, which is supplied with heated air directed into the tunnel from the end thereof from which the articles issue. As they issue from the tunnel their support encounters a fourth turnover track section which again brings the articles into suspended position a few steps to the rear of severing apparatus. The articles, upon being advanced into association with such apparatus, are subjected to heating flames at the desired line of severance and upon leaving the field of influence of these flames encounter wet carborundum severing knives which complete the severing operation, allowing the decorated articles to drop on a suitable conveyor. During the subsequent travel of the chucks toward the loading station, they are opened and the moil forcibly removed therefrom.

*Detailed description*

Figure 3:
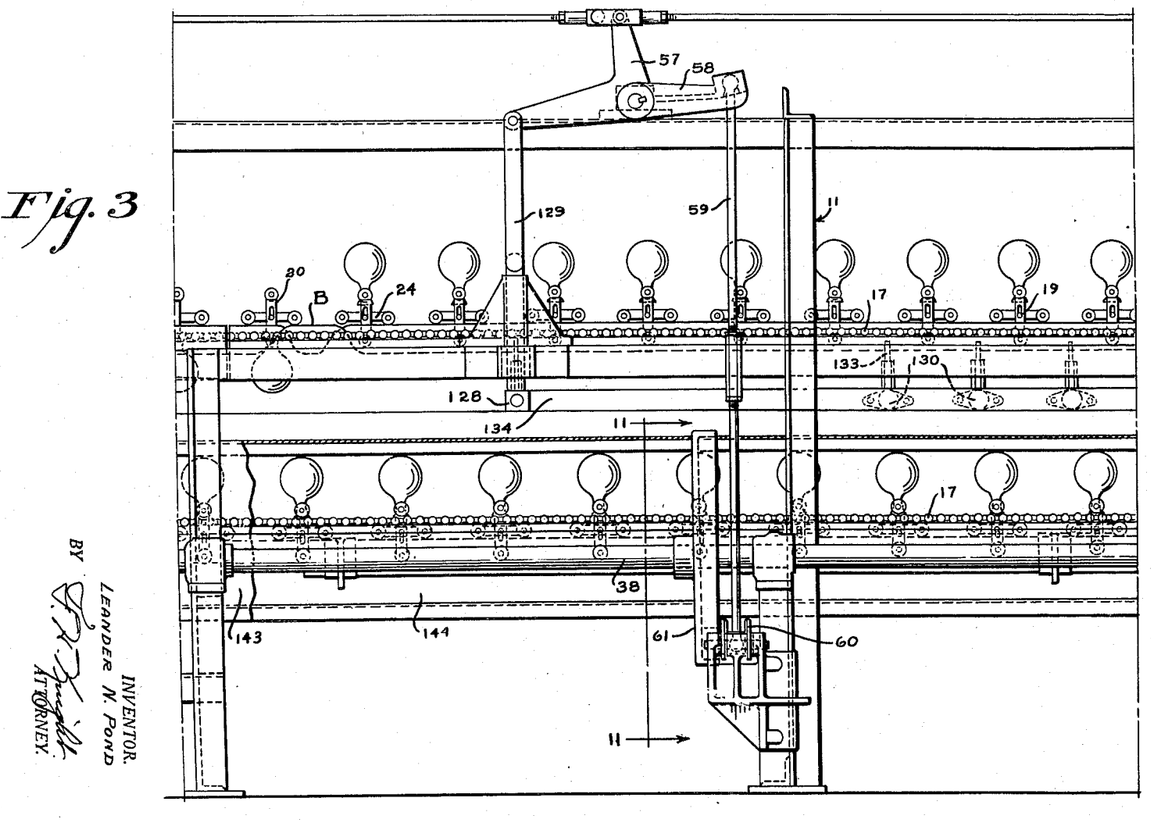
Figures 4, 4A:
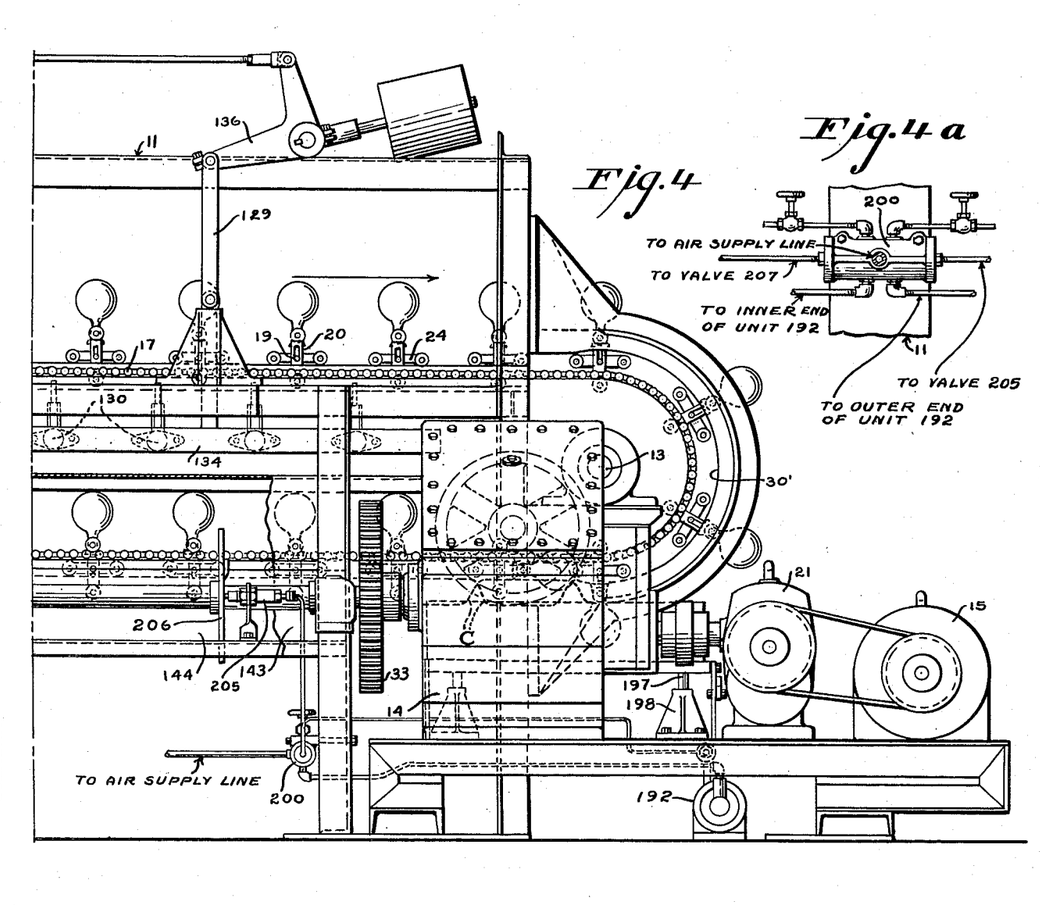
Fig. 4a is a side elevation of a control valve assembly appearing in end elevation in Fig. 4.
Figures 5, 5A:
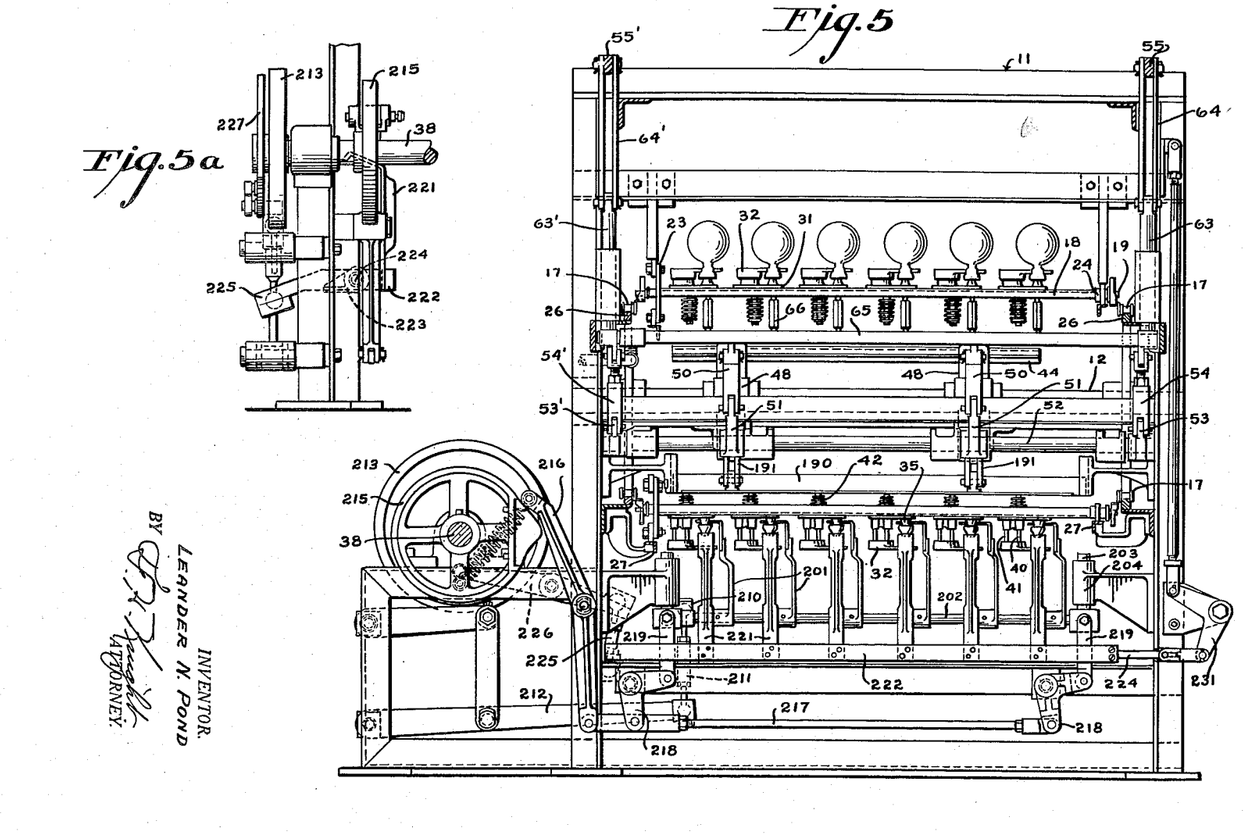
Fig. 5 is an end elevation taken approximately on line 5—5 of Fig. 1.
Fig. 5a is a side elevation of a fragment of the disclosure of Fig. 5.

The entire apparatus is supported in a suitable frame of substantial length, generally designated 11, provided at either end with suitable bearings for transverse shafts 12 (Fig. 1) and 13 (Fig. 4). The shaft 13, near its ends (Fig. 9), is equipped with like sprocket wheels 16 and the shaft 12 is similarly equipped. Endless conveyor chains 17 are carried by the sprocket wheels of the respective shafts 12 and 13 and are intermittently driven in step-by-step fashion by an intermittent drive unit 14 (Figs. 9 and 9a), driven from a motor 15 (Fig. 4) through a suitable reduction gear unit 21. A continuously rotating shaft 28 of unit 14 carries a gear 33 which is in mesh with a gear 34 of an accessory drive shaft 38. The above referred to conveyor chains 17 are bridged by a plurality of chuck carrying bars 18 (Figs. 5, 8 and 9), the ends of which are in the form of axles 19 which project into slotted apertures of fittings 20 suitably spaced in the conveyor chains 17. Adjacent the opposite ends of each bar are supports 23 and 24 each having a pair of rollers 25. The supports 23 and 24 are alike, except that they are arranged at right angles to one another. Tracks 26 and 27 are provided on which the rollers of the respective supports travel and are of such configuration at locations designated A and D (Fig. 1), B (Fig. 3), and C (Fig. 4) that they cooperate with the bar supports to effect 180° turning movement of a bar 18 about its axis at these selected places along its path of travel and constitute the previously referred to turnover track sections. At the ends of the machine the bar supporting rollers engage auxiliary tracks 30 and 30' which span the arcuate gaps between tracks 26 and 27 and hold the article chucks in a predetermined position with respect to the chains as they travel about the ends of the machine.

Figures 7, 7B:
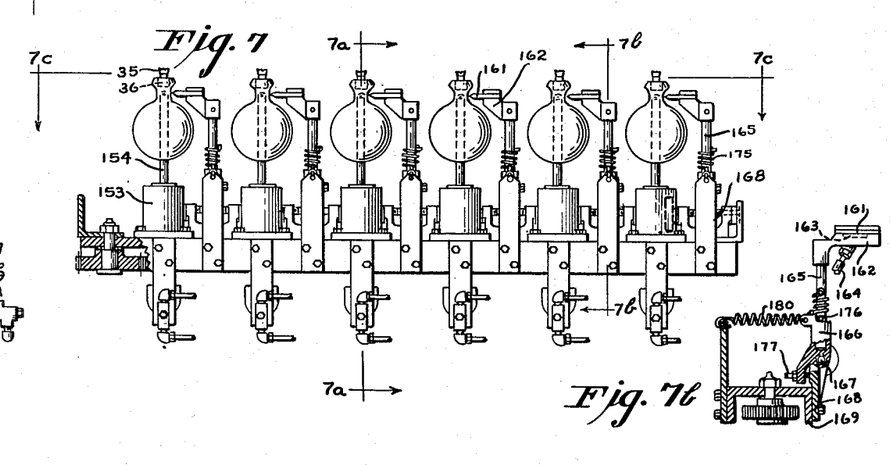
Fig. 7 is a side elevation of severing equipment shown in end elevation of Fig. 1, with certain parts broken away.
Fig. 7b is taken on line 7b—7b of Fig. 7.

Each of the chucks carried by a bar 18 (Figs. 5 and 8) in the main comprises castings 31 and 32. Casting 31 is fixed to bar 18 and is provided with movable jaw holding and guide rod apertures, not shown, and a nipple portion 35 which carries a tapered rubber bushing or fixed chuck jaw 36. A movable jaw 37 of U configuration, comprising an integral part of casting 32, is arranged in alignment with the fixed jaw. Depending from casting 32 are holding and guide pins 40 and 41 which enter the apertures provided therefor in casting 31. Pin 40 passes through the aperture provided therefor and a suitable aperture in the bar 18 and is surrounded by a spring 42 tensioned to tend to close the jaw 37 down over jaw 36 (Figs. 1a and 7).

Figures 1, 1A:
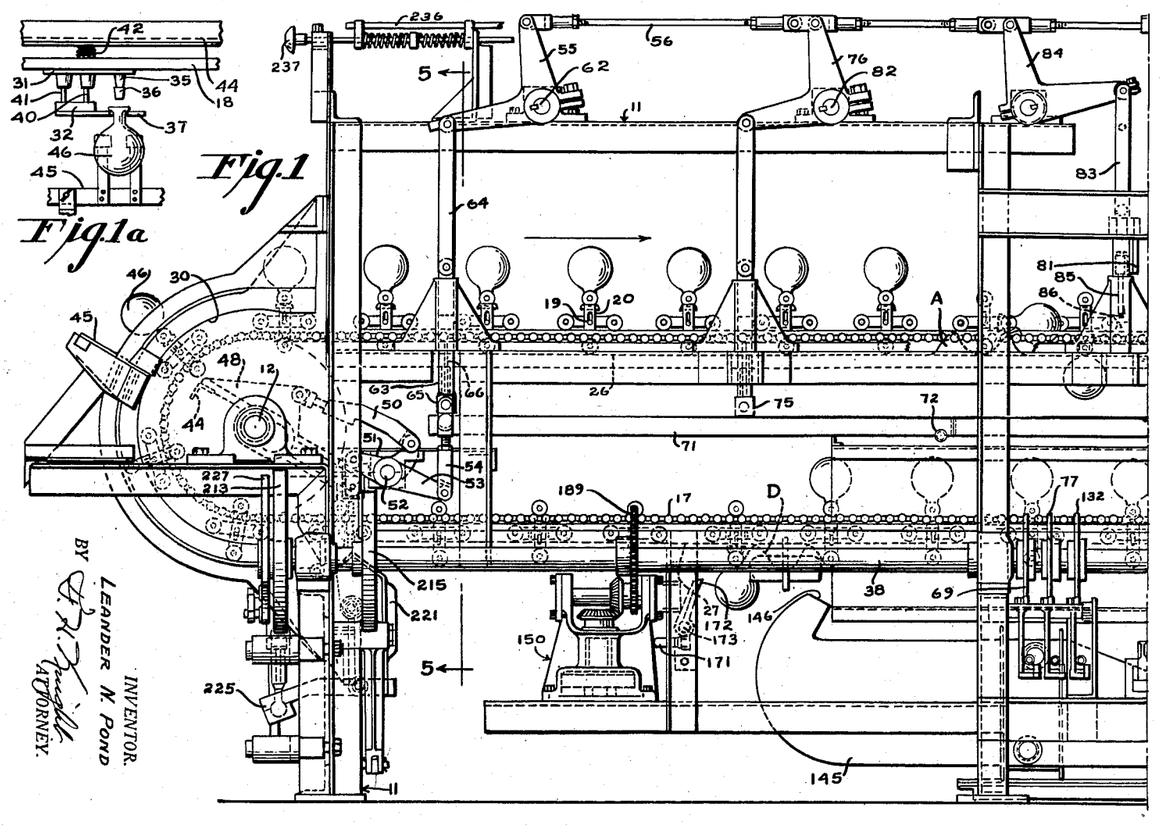
Figs. 1 to 4 together comprise a side elevation of the apparatus.
Fig. 1a is a perspective view of a fragment of Fig. 1.
Figure 11:
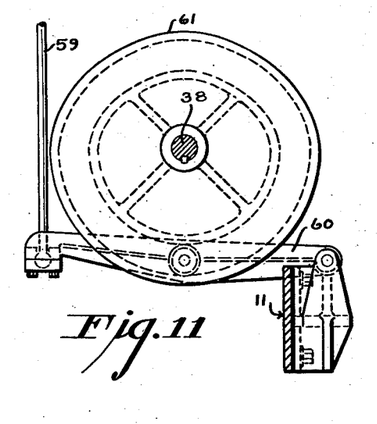
Fig. 11 is a sectional view of a rod drive arrangement on line 11—11 of Fig. 3.

The chuck jaws of supporting bar 18 are opened by pressure applied to their holding pins 40 by a chuck opening bar 44 as the bar 18 approaches a loading station located at the left end of the machine (Fig. 1). The chucks, upon being opened, come to rest in such a position with respect to a loading platform 45 that articles 46 can be so placed thereon that their necks rest in the movable chuck jaws and have their openings faced toward the fixed chuck jaws, as illustrated in Fig. 1a. The chuck opening bar is carried by a pair of supports 48 (Figs. 1 and 5) having elongated apertures through which shaft 12 passes. To force the bar 44 into engagement with pins 40 so as to move chuck jaws 37 to their open position against the tension of springs 42, they are coupled by links 50 to levers 51 carried by a shaft 52. This shaft carries a lever 53 linked by a coupling member 54, a guide rod 63 and a coupling member 64 to the lower arm of a bell crank 55 keyed to one end of a shaft 62. The other arm of bell crank 55 is connected with a bell crank operating rod assembly 56 which extends substantially throughout the length of the machine. The shaft 52 also carries a lever 53' linked by a coupling member 54', a guide rod 63' and a coupling member 64' to a lever 55' also keyed to shaft 62. The back and forth movement of assembly 56 required for appropriately swinging bell crank 55 and lever 55' to move chuck jaws 37 to their open position is effected by means of a bell crank 57 (Fig. 3) actuated through the medium of a lever 58, a rod assembly 59, and a lever 60. The lever 60 is rocked by a cam 61 (Figs. 11 and 3) driven by an accessory shaft 38. The drive of the conveyor chains 17 to advance the chuck jaws a further step is arranged to occur just after the withdrawal of bar 44 from association with the chuck jaw holding rods 40 has been effected.

Figure 13:
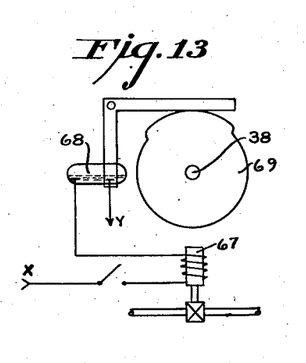
Fig. 13 is a schematic view illustrating the manner of valving fluid to certain of the fluid delivery nozzles of the apparatus.

The first washing of the interior of the seized articles is arranged to occur following the third step of their advance from the loading platform (Figs. 1 and 1a). The equipment provided for this purpose comprises a manifold 65 fixed to the lower ends of guide rods 63 and 63' and is equipped with nozzles 66 which are projected into the articles as the shaft 62 is turned clockwise to open another group of chucks which have just arrived at the loading platform. As the nozzles are raised a solenoid operated valve 67 (Fig. 13) has its circuit closed by a mercury switch 68 under control of a cam 69 (Figs. 1 and 13) carried by shaft 38, permitting washing fluid, in the instant case comprising stannous chloride, supplied to manifold 65 at a suitable pressure, to be sprayed over the inner surfaces of the articles. A drip pan 71 is arranged below the manifold and below the subsequent path of travel of the articles and catches the fluid which drains therefrom. This drip pan has an outlet 72 which may connect with a pipe leading to suitable recovery apparatus.

A few steps beyond the location of manifold 65 a similar nozzle equipped manifold 75 is provided. This manifold is raised and lowered by a bell crank 76 and a lever (not shown) keyed to a shaft 82. The supply of fluid to the nozzles of manifold 75 is under control of a mercury switch and solenoid valve, like that shown in Fig. 13, and actuated by a cam 77 (Fig. 1).

The rollers 25 of a chuck carrying bar in the second step of advance beyond the rinsing station arrives at the location designated "A" where the contour of track 26 is such as to effect 180° rotation of the bar about its own axis in a manner to bring the articles to a stop in their neck-up position under concentrically arranged fluid supply nozzles 85 and 86 carried by a bar 81. This bar extends transverse of the machine and at each end is coupled by a link 82 to a lever (not shown) and a bell crank 84 operable by the rod assembly 56 to lower the nozzles into the articles as the nozzles located at the washing and rinsing stations already described are being raised into operative relation with other groups of the articles 46.

Figure 6:
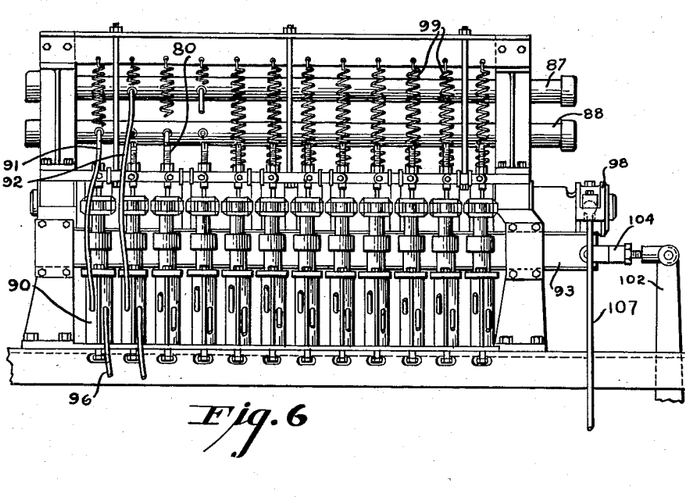
Fig. 6 is an end elevation of pump assemblies appearing in part in side elevation in the upper left hand portion of Fig. 2.
Figure 6A:
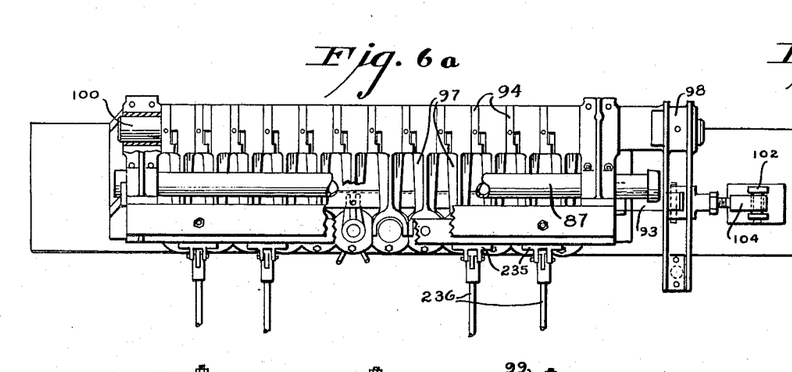
Fig. 6a is a plan view, for the most part, of that portion of the apparatus illustrated in Fig. 6.
Figures 6B, 6C:
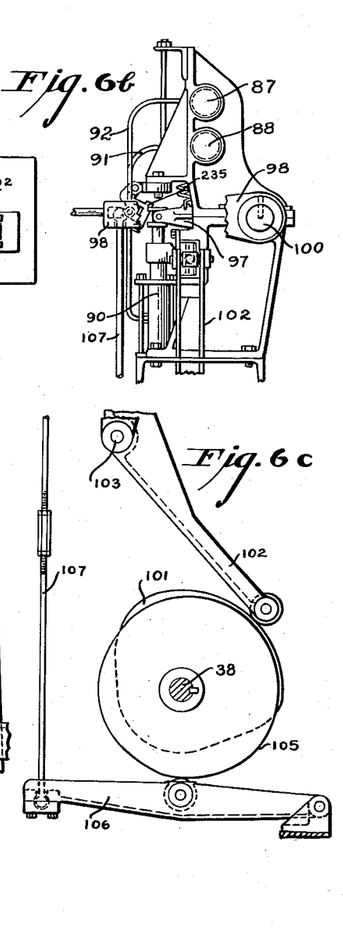
Fig. 6b is an end elevation of Fig. 6.
Fig. 6c is a view illustrating the lower portion of drive equipment shown in part in Fig. 6.
Figure 10:
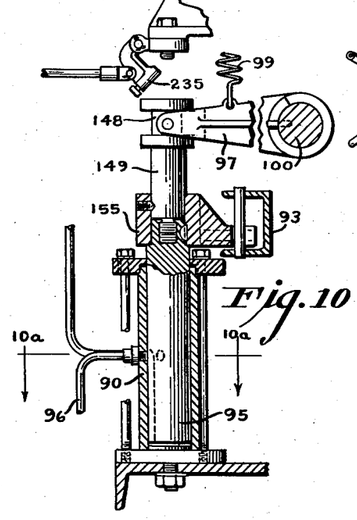
Fig. 10 is an enlarged view mostly in section of one of a group of pumps and associated equipment illustrated in full in Figs. 6–6b.
Figure 10A:
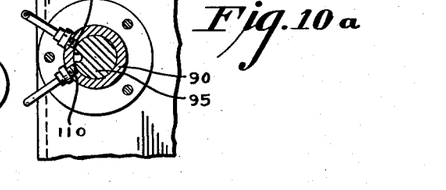
Fig. 10a is a sectional view taken on line 10a—10a of Fig. 10.

Each nozzle 85 and 86 delivers a measured quantity of a particular silvering fluid to the article. These fluids are drawn from supply manifolds 87 and 88 (Fig. 6) respectively by piston type measuring pumps 90 (Figs. 6–6b, 10 and 10a) through suction hoses 91 and 92, and delivered to the nozzles through hoses 96. Each pump 90 (Figs. 10 and 10a) comprises a grooved piston 95 operating in a cylinder having a fluid intake opening 109 adapted to be brought into register with the groove in piston 95 during its suction stroke and to be blocked by the piston during the delivery stroke and having a fluid delivery opening 110 blocked by the piston during its suction stroke and in register with its groove during its delivery stroke. The upper end of each piston is provided with an extension 149 at its top provided with a spool 148 adapted to receive between its heads the forked end of a piston reciprocating lever 97. The upper end of the piston also passes through one end of a piston turning lever 155 for bringing the piston groove into and out of register with the openings 109 and 110.

The piston reciprocating levers 97 are all carried by a shaft 100 (Fig. 6a) and are adapted to be engaged by collars 94 fixed to the shaft and which positively moves them when the shaft is turned in a direction to lower the pump pistons. The return or upward movement of the pistons is effected by springs 99 under control of collars 94 during the turning of the shaft 100 in the reverse direction.

The turning of shaft 100 through the arc required to reciprocate the pistons as necessary to deliver a predetermined quantity of fluid is effected by a lever 98 having one end fixed to the shaft 100 and its other end linked by a rod 107 to a lever 106 actuated by a cam 105 carried by the accessory shaft 38. The stroke of any pump can be modified to change the quantity of fluid delivered by an associated adjusting screw 80 which limits the upward movement of a pump piston by its spring 99.

The free ends of the piston turning levers 155 are forked and register with teeth of a piston turning bar 93 which is reciprocated to impart the necessary turning movements to the respective pistons. Reciprocation of bar 93 is effected by a lever 102 pivoted intermediate its ends at a fixed point 103. The lever at one end is coupled to bar 93 by a link 104 and at its opposite end carries a roller which rides on the face of a suitably shaped bar shifting cam 101 also carried by shaft 38.

Figure 2:
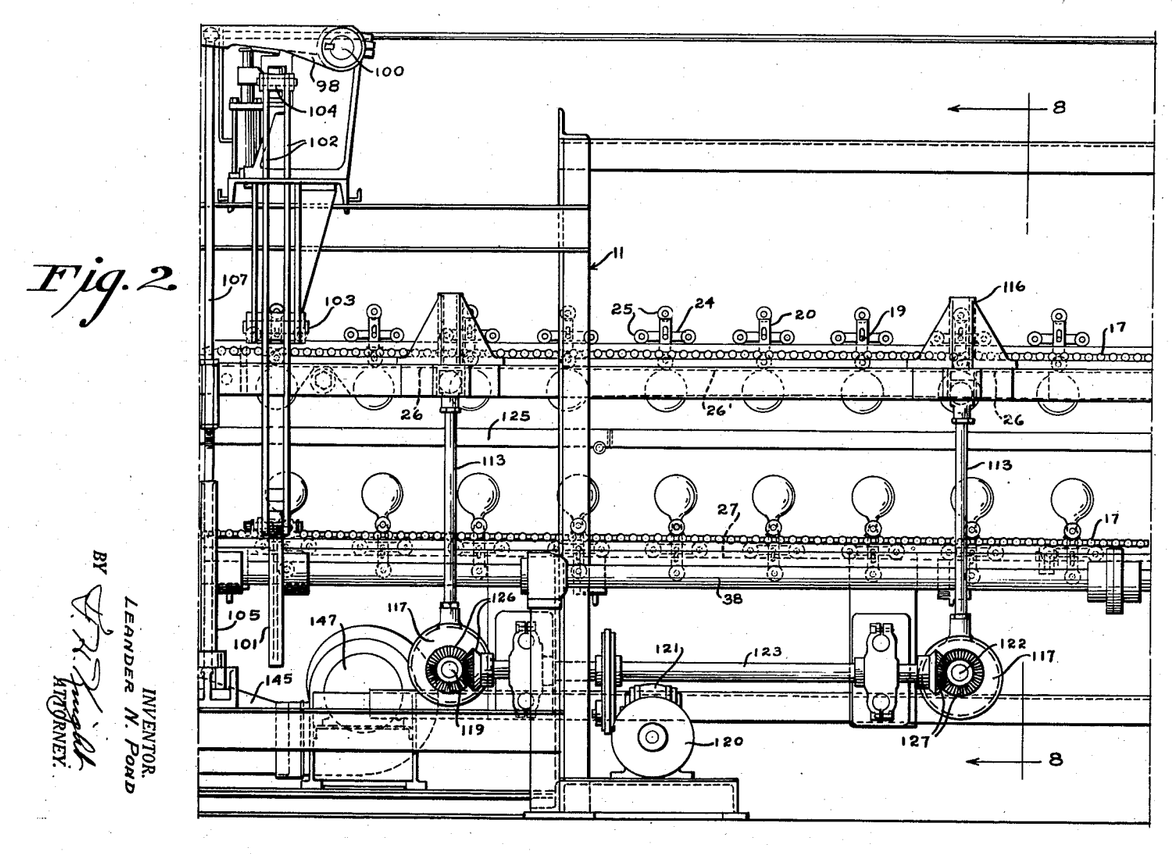
Figures 8, 8A:
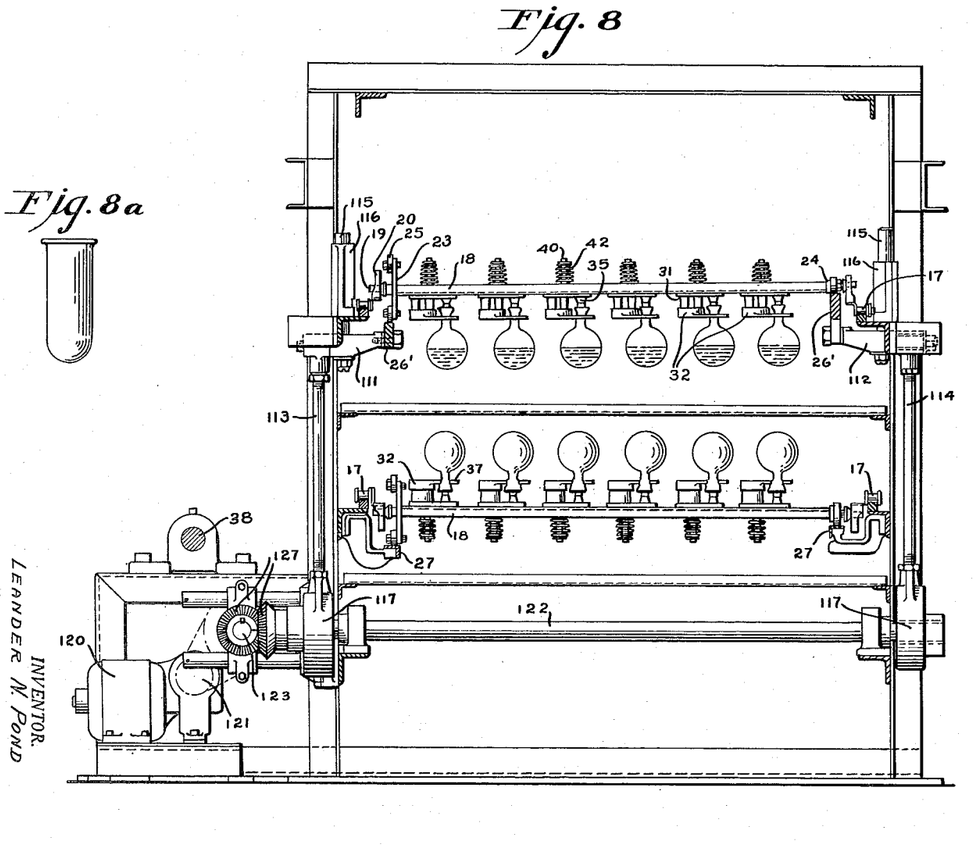
Fig. 8 is a sectional elevation taken on line 8—8 of Fig. 2.
Fig. 8a illustrates an alternative form of article to those shown in the other figures of the drawings.

The major portion of track 26, over which the rollers 25 of chuck bar supports 23 and 24 travel are rigidly fixed to parts of the framework 11 of the machine; however, the oppositely disposed rails 26' (Figs. 2 and 8), which carry the bars for a six step distance beyond the silver solution receiving station, are supported at their ends on vertically movable brackets such, for example, as 111 and 112 (Fig. 8) supported by eccentrically driven connecting rods 113 and 114 which impart vertical movement to the one end of the rails of track section 26' shown in Fig. 8. As will be understood from an inspection of Fig. 2, the other end of the rails of this section are similarly supported. Any lateral or longitudinal movement of the rails of this section is prevented by suitable guide posts 115 carried by the brackets 111 and operative in associated sleeves 116. The connecting rods 113 and 114 at the corresponding ends of the rails of this track section are driven by eccentrics 117 (Fig. 8) carried by a cross shaft 122 and driven by a motor 120 through bevel pinions 127, a drive shaft 123 and a suitable reduction gearing 121. The eccentrics are so positioned as to lift one rail at one end of the track section while the corresponding end of the other rail is being lowered. At the opposite end of the track section a cross shaft 119 is provided which is also driven off shaft 123 by means of bevel pinions 126. The eccentrics driven by shaft 119 are the same as those already described except that the eccentrics are so set on shaft 119 that each raises the track rail at its end of the section while the eccentric at the opposite end is lowering that end of the rail. In other words, the track sections are given a compound rocking movement. This arrangement is provided to thoroughly agitate the liquid contained within articles after they have passed the silver solution receiving station.

At a convenient distance beyond the movable track section 26' a chuck carrying bar arrives at the turnover location designated "B" where the contour of track 26 is such as to again rotate the bar 180° about its own axis, thereby positioning the articles in neck-down position to permit the solutions to drain therefrom. A suitable pan 125 is provided to collect these fluids which may later be salvaged.

A few steps beyond location B there is provided a rinsing apparatus similar to that already described. This apparatus comprises a nozzle equipped manifold 128 through the nozzles of which rinsing fluid is supplied through a valve and associated equipment, similar to that shown in Fig. 13, under control of a cam 132 (Fig. 1).

Provision is made to dry the interiors of the articles after they have been inverted long enough to rather thoroughly drain the rinsing solution therefrom. As depicted in Figs. 3 and 4, drying is accomplished by providing nozzles 133 for directing drying fluids into the interior of the articles during the pauses between eight steps of their advancement. These nozzles are threaded into suitable manifolds 130 carried on a framework 134, which also supports manifold 128, and are supplied with drying fluid from any suitable source (not shown). The frame 134 at opposite sides is suspended from suitable guide posts coupled to levers (not shown) and bell cranks 57 and 136 in a manner which will be well understood. The arrangement is such that each time the conveyor is brought to a stop the nozzles 133 are raised to direct drying fluid into those articles with which they are in register.

Figures 9, 9A:
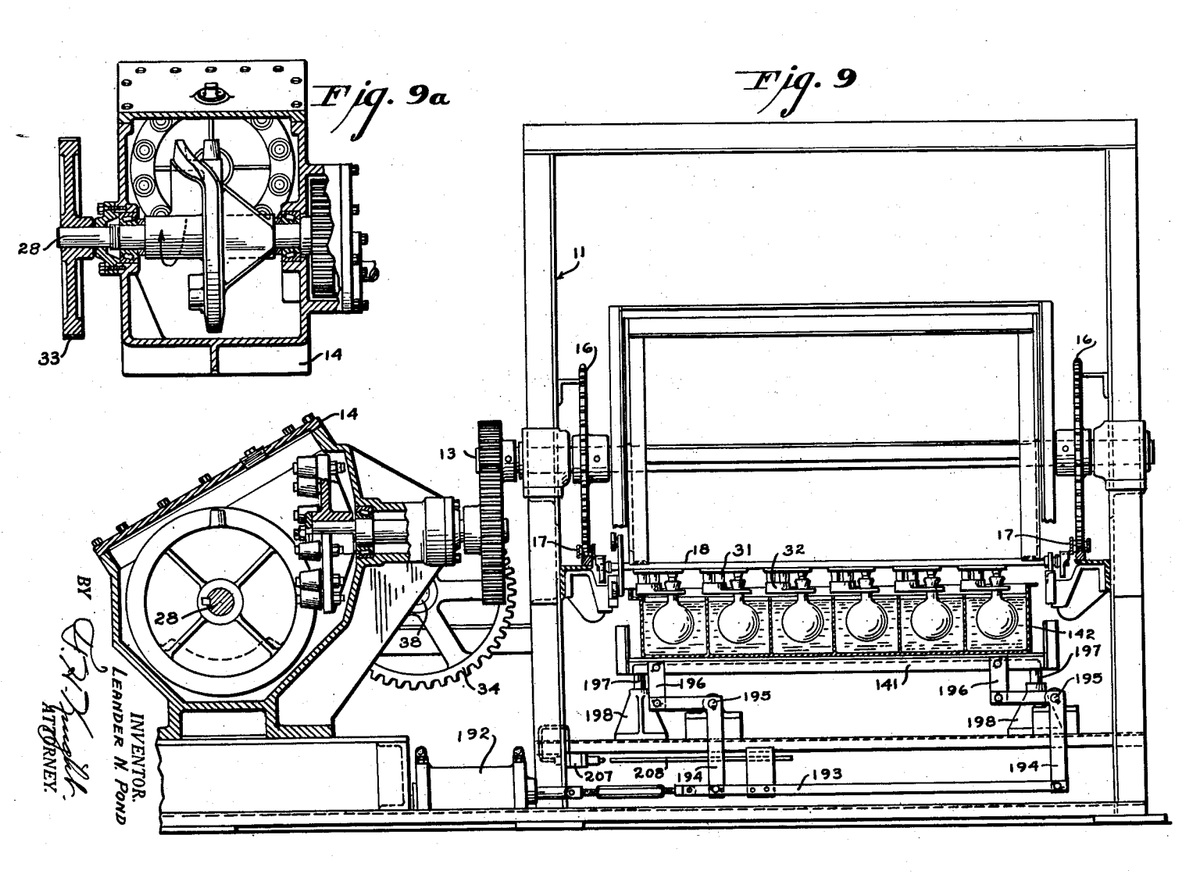
Fig. 9 is an elevation partly in section of the end of the apparatus disclosed in Fig. 4.
Fig. 9a is a vertical sectional view of the intermittent drive unit.

Exterior coating of the articles is arranged to occur at the end of the machine appearing in Figs. 4 and 9 during the beginning of the travel of the articles toward the loading end of the machine (Fig. 1). This equipment comprises a vertically movable platform 141 on which a multicompartment tank 142 of coating materials is arranged and into which the articles are dipped after the initial portion of their return movement. The platform is raised and lowered by a pneumatic power unit 192 having a drive rod extension 193 coupled to the free lower ends of bell cranks 194 keyed to shafts 195 and having their upper ends coupled to the platform by suitable links 196. The opposite ends of shafts 195 (not shown) have levers (not shown) keyed thereto and coupled to the platform by means of links (not shown) but similar to the links 196. Suitable guide posts 197 depend from the platform and operate in guides 198. Air is supplied to the inner end of the power unit, to raise the platform, through a control valve 200 when such valve is actuated as a result of the bleeding of air therefrom by a bleeder valve 205. This bleeder valve is actuated at the proper time by a cam 206 carried by the accessory shaft 38. Air is supplied to the outer end of such unit, to lower the platform, through control valve 200 when such valve is actuated as a result of the bleeding of air therefrom by a bleeder valve 207. A rod 208 carried by the drive rod extension 193 is arranged to actuate bleeder valve 207 when the platform has been raised the desired distance. The platform 141 is raised just after a row of articles have advanced sufficiently to clear the first approached wall of the containers and is lowered in time to clear it of the path of the next approaching row of articles. At turnover station C, which is in the vicinity of the leaving walls of the tanks 142, the contour of track 27 is such that the articles are rotated to a horizontal position as they are being withdrawn from the coating material and on the subsequent forward step of the conveyor complete rotation of the articles to their inverted position.

A drying tunnel 144, most of the side cover 143 of which has been broken away, extends from the vicinity at which the articles are inverted following their exterior coating treatment to within a short distance of the severing apparatus (Fig. 1) generally designated 150. Arranged below the exit end portion of the tunnel 144 is an air box 145 having an open end 146 adapted to direct a current of drying air into the tunnel. The air box is equipped with suitable heating elements (not shown) and a blower unit 147 so that heated air is blown against the articles most forcefully just before they issue from the tunnel to insure thorough drying of the articles before they reach the severing apparatus. As the articles issue from the tunnel the turnover section D of track 27 is encountered and the articles accordingly are rotated 180° a short distance to the rear of the severing equipment 150.

Figure 12:
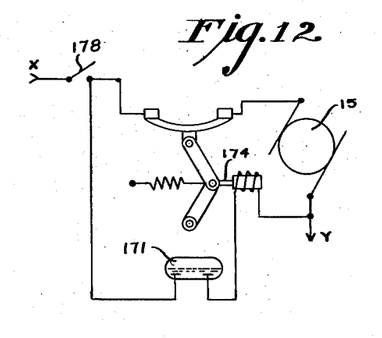
Fig. 12 is a schematic view of an operating circuit for the main drive motor of the apparatus.

There is very little clearance between the lower edges of chuck jaws 37 and certain parts of the severing equipment. It is accordingly important to prevent a group of chuck assemblies from being advanced into association with the severing equipment if any chuck of the group has failed for any reason to raise the necessary amount to pass clear of such parts. Such protection is afforded by including in the circuit of drive motor 15 a mercury switch 171 adapted to be tilted to open position by any one of a plurality of levers 172 carried by a shaft 173 and arranged to be actuated by any improperly raised chuck jaw which is about to encounter the equipment 150. The circuit of motor 15 (Fig. 12) extends from the terminal X of a suitable current source, through a hand switch 178, contacts of a circuit 174 and the motor to the terminal Y of the same current source. It will be observed, however, that the breaker circuit includes the mercury switch 171 and accordingly when such switch is opened the circuit breaker trips and opens the motor operating circuit, thereby stopping advancement of the bars. Since the circuit of the breaker switch 174 includes switch 171, restarting of motor 15 can only be effected after the offending chuck jaw has been properly raised to allow switch 171 to reestablish the breaker circuit.

Figures 7A, 7D:
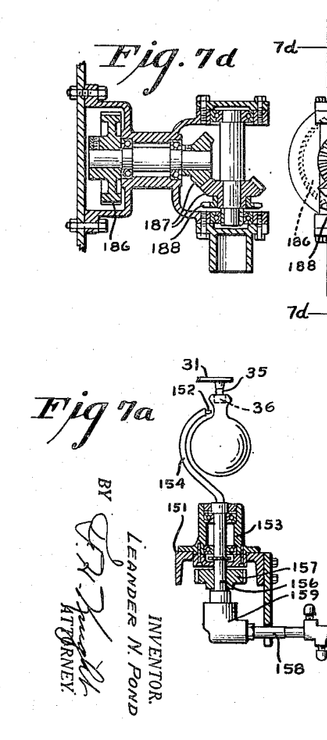
Fig. 7a is taken on line 7a—7a of Fig. 7.
Fig. 7d is taken on line 7d—7d of Fig. 7c.
Figure 7C:
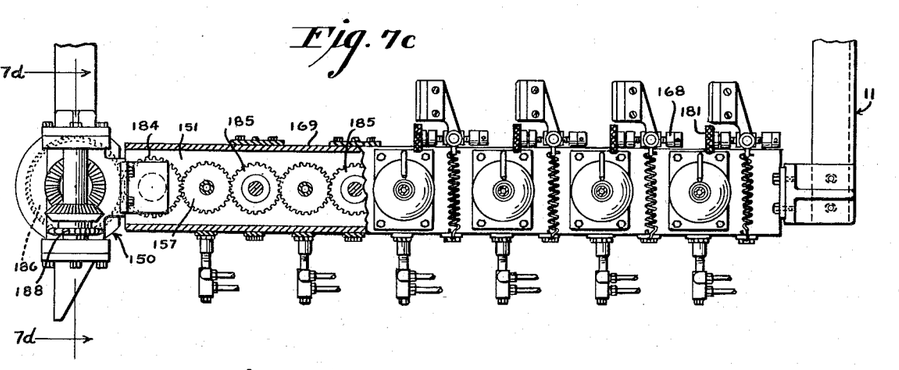
Fig. 7c is a plan view partly in section, for the most part, of apparatus illustrated in Fig. 7.

The severing equipment, illustrated in Fig. 1 and Figs. 7–7d, is mounted on a channel iron 151 located at the loading end of the machine and is adapted to simultaneously sever the articles held by the chucks of a bar 18. The severing mechanism includes a single nozzle burner 152 and a scoring Carborundum knife 161 for each of the articles to be simultaneously severed. Each burner nozzle is carried at the free end of a goose-neck 154 coupled to a nipple 156 rotatably supported in suitable bearings within a housing 153 mounted on channel iron 151 over an aperture therethrough. The nipple 156 depends from the lower extremity of the housing 153 and has keyed thereto a burner drive pinion 157. The lower end of nipple 156 is connected with a fuel supply line 158 through a suitable elbow 159.

Each Carborundum knife 161 is clamped to a bracket 162 having a reservoir 163 supplied with water through a suitable tube 164. The water is supplied under slight pressure and, because of the porosity of the carborundum, keeps it wet at all times. The bracket 162 is supported on a post 165 the lower end of which extends into a socket member 166 threaded on a shaft 167 passing through bearing apertures of a forked member 168 secured to flange 169 of the channel iron 151 to the right of the burner assembly with which it cooperates. The post 165 is surrounded by a helical spring 175 arranged to tend to rotate the knife towards an article to be severed by it. Rotation in this direction is, however, prevented by engagement of a pin 176 carried by the post with a shoulder of the socket member 166. The knife assembly is kept from turning counter-clockwise on shaft 167 by an adjusting screw 177 carried by the socket member 166 and adapted to engage the forked member 168, but is permitted to swing in a clockwise direction, which is in a direction away from an article to be severed, by a spring 180 which normally holds the assembly in or near vertical position in accordance with the setting of the adjusting screw. The shaft 167, supporting the socket member, is provided with a thumb wheel 181 by means of which shaft 167 may be rotated to shift member 166 and the parts carried thereby laterally.

Arranged intermediate and in mesh with pinions 157 of the several burner assemblies are pinions 185 carried by stub shafts so that through rotation of the pinion of one burner assembly all of the remaining burner assemblies are rotated in like fashion. The drive of the burners is through gear wheels 184 and 186 driven through the medium of bevel pinions 187 and a sprocket wheel 188 driven by a chain surrounding it and a sprocket wheel 189 (Fig. 1) carried by the accessory shaft 38 of the machine.

The heating of the neck of the articles preparatory to crack-off by the severing knives occurs in the pause between steps of the conveyor chains, and the severing knives are so positioned that as the heated articles are advanced away from the severing station each article rubs a severing knife to complete severance of the article from the chuck held moil portion thereof.

Two steps beyond the severing station a second chuck opening bar 190 (Fig. 5) is provided. This bar is coupled to the left ends of levers 51 (Fig. 1) by links 191 (Fig. 5) and is lowered into engagement with the holding pins of the chucks from which articles have been released to open such chucks so that the moil can be stripped therefrom. This operation occurs at the same time that levers 53 and 53' are being actuated to effect the opening of chucks located at the loading platform.

To remove the moil from the fixed chuck jaws 36, strippers 201 are provided. These strippers are forked at their upper ends and at their lower ends are fixed to an operating shaft 202 carried by posts 203 vertically movable in suitable guides 204. The free ends of strippers 201 are normally swung out of operative relation with the chuck nipples 35 about the axis of shaft 202. To bring them into operative position, in which position their forked ends partly surround such nipples, mechanism is provided for rotating shaft 202 as required to bring the forked ends of the strippers into their operative position. This mechanism includes an arm 210 (Fig. 5) having one end fixed to shaft 202 and its opposite end coupled to a link 211 connecting it with a lever 212 operated by a stripper rocker cam 213 carried by shaft 38. To effect the actual stripping operation the shaft 202 is arranged to be lowered by means of a stripper lowering cam 215 which lowers shaft 202 and the strippers carried thereby by means of a lever 216, a link 217, bell cranks 218 and links 219. Upon being lowered, the strippers engage the article necks and strip them from bushings 36 causing them to drop onto the movable chuck jaws 37.

To remove the article necks from the latter chuck jaws, ejectors 221 are provided. These ejectors, at their lower ends, are secured to a slide bar 222 carried by bearings such as 223 (Fig. 5a) pivoted on a shaft 224. The bar at its left end (Figs. 5 and 5a) is attached to a lever 225 having its opposite end linked to a lever 226 operable by a cam 227 whose contour is such that it swings the ejectors over the movable jaws.

The bar 222 is shown with its ejectors in position to push the moil from the movable chuck jaws; however, prior to the arrival of the chucks in position to have the moil removed therefrom, the ejectors 221 are arranged to the left of the associated chuck assemblies, as is necessary to enable them to pass the ejectors. The ejectors are then moved to the position shown through the medium of a linkage including a bell crank 231 coupled to the link 64 associated with the bell crank 55 of the drive rod assembly. In other words, the arrangement is such that just after the intermittent drive advances a bar of loaded article chucks to the position shown in the lower part of Fig. 5, the assembly shifts bar 222 laterally to the position shown and an instant later cams 213 and 215 become effective to actuate the strippers as required to strip the article necks from the fixed jaw bushings. These operations are closely followed by the action of cam 227 to swing the free ends of the ejectors over the movable chuck jaws to force the moil out of the jaws, usually onto a movable conveyor. If desired, the severing operation may be dispensed with. Under these circumstances if the articles being treated are of bulbous short neck type, the chuck jaws 37 in moving to their open position will engage and strip the articles from the plugs or jaws 36. If on the other hand the articles have rather long neck portions or are of shapes similar to that shown in Fig. 8a, the strippers will perform their operation in the manner already described.

In the structure illustrated, each chuck carrying bar is equipped with six chucks. Under certain circumstances it becomes desirable to employ a less number of chucks than provided. To prevent the waste, under these circumstances, of the rather expensive silver solutions means is provided for disabling the pumps which are not needed. This means comprises a pump piston hold-down member 235 (Figs. 6a, 6b and 10) for each pair of pumps. These members are pivotally suspended in such a manner that they can be swung in position to block the pistons in their down position, and are coupled to operating bars 236 extending back to the loading end of the machine and equipped with operating knobs 237 for convenient operation by the operators who load the machine.

I claim:

1. In a machine of the class described, means for seizing a hollow open mouthed necked article from a support at a loading station and for advancing it over a predetermined path to a discharge station, means for treating the inner surfaces of the article and for treating the outer surfaces thereof during its travel between the loading and discharge stations, and means for severing the neck of the article at the discharge station at a point intermediate its seized portion and the article proper.

2. In a machine of the character described, groups of article chucks, groups of nozzles for directing fluids into hollow articles held by said chucks, means for moving said chucks into register with the nozzles of the respective nozzle groups in succession, means for moving the nozzles toward articles which have been brought into register therewith, separate means for supplying fluid to the respective nozzles and devices for at will selectively disabling said last means.

3. In a machine of the character described, sets of chuck assemblies, means for moving said assemblies over a closed path, a movable track supporting said assemblies during their travel about a portion of such path, and means for imparting a rocking movement to said track.

4. The method which includes supporting a hollow glass body by an open ended portion thereof to be removed therefrom, holding the supported body with its opening faced up, introducing a coating solution into the interior of the body, agitating the solution for a predetermined time period, turning the supported body to a position in which the excessive solution may be drained therefrom, and subsequently severing the body from the portion thereof from which it is supported.

5. In a machine for coating surfaces of glass articles, chucks for holding the articles by moil portions thereof, means for momentarily subjecting the surfaces other than the moil surface portions thereof to a fluid bath of coating material, means for inverting the articles to cause surplus coating material to drain toward their moil portions, means for accelerating the drying of the coated articles, means for severing the articles from the moil portions and means for thereafter releasing the moil portions from the chucks.

6. The method of treatment of a hollow glass article having an opening into the interior of the article, which includes supporting the article by a fragmentary portion of the free end of the article, circulating washing fluids over the inner surfaces of the article, holding the article in an upright position and introducing coating fluids into it, agitating the supported article to subject all of its inner surfaces to the action of the coating fluids, draining such fluids from the article, washing and drying the interior surfaces thereof, coating the exterior surfaces of the article, drying such surfaces and finally releasing the article from the support.

7. In an apparatus of the character described, a chuck having a plug adapted to enter an opening in an article seized by the chuck and having a jaw adapted to partly surround such article and from which the article becomes suspended when the chuck is opened and in a predetermined position, means for so positioning said chuck, means for opening the chuck, and means for ejecting the article from the jaw.

8. In an apparatus of the character described, a chuck assembly including a plug to be forced into an article to be held thereby, a jaw to partly surround such article, means for operating said jaw relative to the plug to force the article over said plug, means for restoring the jaw to its initial position, and means for stripping the article from the plug.

9. In an apparatus of the character described, a chuck assembly including a part to be forced into an article to be held thereby, a second part to partly surround such article, means for operating one of said parts relative to the other to force the article over said first part, means for restoring the operated part to its initial position, means for transferring the article from the first part to the second, and means for ejecting the article from the second part.

10. In a machine of the character described, a movable conveyor, chucks supported by said conveyor, a motor for moving said conveyor about a closed path, an operating circuit for said motor, means for closing said chucks and for holding them closed, and means to open said circuit arranged in the path of travel of any of said chucks which has failed to close.

11. In an apparatus of the character described, means for supplying predetermined quantities of fluid into articles being treated, said means including a reciprocating piston pump for each fluid, each said pump having a cylinder with fluid intake and delivery ports and a grooved fluid intake and delivery piston adapted to be brought into cooperative relation with the pump cylinder ports by oscillating the piston, means for reciprocating the piston and for oscillating it the required distance and in such timed relation with respect to its reciprocating movement to charge the pump with a measured quantity of fluid and to then discharge it therefrom into an article.

12. The method which includes supporting a glass body by a neck portion thereof to be removed therefrom, coating a surface of the body and severing the same from the neck portion thereof from which it is supported.

13. The method of finishing a hollow glass article having a neck portion through which the article has been blown and the free end of which neck portion is waste glass, which involves holding the article by the waste glass portion thereof, and while so holding it subjecting its surfaces to liquid baths and to a drying atmosphere and finally releasing the article by separating it from the held waste glass.

14. The method of coating the surface of an article of glass having a neck portion, which includes holding the article in suspended position by its neck portion, subjecting the remaining portion of the article to a fluid bath of coating material for a short period of time, substantially immediately thereafter inverting the article to cause excessive coating material thereon to drain therefrom towards the neck portion thereof, conveying the coated article through a drying atmosphere while in such position, rotating the article to the suspended position and releasing it from the support.

15. The method of treatment of a bulbous hollow glass article with a neck portion having an opening into the interior of the article, which includes supporting the article by a fragmentary portion of the free end of the article neck, circulating washing fluids over the inner surfaces of the article, holding the article in an upright position and introducing coating fluids into it, agitating the supported article to subject all of its inner surfaces to the action of the coating fluids, draining such fluids from the article, washing and drying the interior surfaces thereof, coating the exterior surfaces of the article, drying such surfaces and releasing the article from the support by severing the neck of the article at a point below the portion thereof from which it is supported.

16. In a machine of the class described, means for seizing a hollow open mouthed necked article from a support at a loading station and for advancing it over a predetermined path to a discharge station, means for treating a surface of the article during its travel between the loading and discharge stations, and means for severing the neck of the article at the discharge station at a point intermediate its seized portion and the article proper.

17. In a machine for the surface treatment of articles, sets of article chuck assemblies, fixed and movable supports together providing a closed path over which said assemblies may be moved, and means for imparting a rocking movement to said movable support.

18. In an apparatus for handling an apertured article, a chuck assembly including two co-operative units, one comprising a plug to be forced into an article aperture and the other comprising a jaw to partly surround the article, means for operating one of said units relative to the other to seat the plug into the article aperture, means for restoring the operated unit to its initial position, and means for stripping the article from the plug.

LEANDER N. POND.